United States Patent
Degani et al.

(10) Patent No.: US 7,606,701 B2
(45) Date of Patent: Oct. 20, 2009

(54) METHOD AND APPARATUS FOR DETERMINING EMOTIONAL AROUSAL BY SPEECH ANALYSIS

(75) Inventors: Yoav Degani, Emek Hefer (IL); Yishai Zamir, Givataim (IL)

(73) Assignee: VoiceSense, Ltd., Kefar Sava (IL)

( * ) Notice: Subject to any disclaimer, the term of this patent is extended or adjusted under 35 U.S.C. 154(b) by 781 days.

(21) Appl. No.: 10/485,254

(22) PCT Filed: Aug. 7, 2002

(86) PCT No.: PCT/IL02/00648

§ 371 (c)(1), (2), (4) Date: Mar. 25, 2004

(87) PCT Pub. No.: WO03/015079

PCT Pub. Date: Feb. 20, 2003

(65) Prior Publication Data

US 2004/0249634 A1    Dec. 9, 2004

(30) Foreign Application Priority Data

Aug. 9, 2001   (IL) ..................... 144818

(51) Int. Cl.
- *G10L 11/04* (2006.01)
- *G10L 19/00* (2006.01)
- *G10L 21/00* (2006.01)

(52) U.S. Cl. ................ 704/207; 704/217; 704/270

(58) Field of Classification Search .......... 704/207, 704/246, 270, 273, 217
See application file for complete search history.

(56) References Cited

U.S. PATENT DOCUMENTS 5,642,466 A * 6/1997 Narayan ............. 704/260
5,860,064 A * 1/1999 Henton ............... 704/260

(Continued)

FOREIGN PATENT DOCUMENTS

WO    9520216    7/1995

(Continued)

OTHER PUBLICATIONS

R. Cowie, E. Douglas-Cowie, N. Tsapatsoulis, G. Votsis, S. Kollias, W. Fellenz, and J. Taylor, "Emotion recognition in human-computer interaction", IEEE Signal Processing Magazine, vol. 18, pp. 32-80, Jan. 2001.*

(Continued)

*Primary Examiner*—Richemond Dorvil
*Assistant Examiner*—Jialong He
(74) *Attorney, Agent, or Firm*—Dennison, Schultz & MacDonald

(57) ABSTRACT

An apparatus for determining emotional arousal of a subject by speech analysis, and an associated method. In the method, a speech sample is obtained, the speech sample is pre-processed into silent and active speech segments and the active speech segments are divided into strings of equal length blocks (the blocks having primary speech parameters including pitch and amplitude parameters), a plurality of selected secondary speech parameters indicative of characteristics of equal-pitch are derived, rising-pitch and falling-pitch trends in the strings of blocks, the secondary speech parameters are compared with predefined, subject independent values representing non-emotional speech to generate a processing result indicative of emotional arousal, and the generated processed result is outputted to an output device.

20 Claims, 3 Drawing Sheets

U.S. PATENT DOCUMENTS

| | | | |
|---|---|---|---|
| 5,995,924 | A | 11/1999 | Terry |
| 6,101,470 | A * | 8/2000 | Eide et al. .................. 704/260 |
| 6,151,571 | A * | 11/2000 | Pertrushin .................. 704/209 |
| 6,173,260 | B1 * | 1/2001 | Slaney ........................ 704/250 |
| 6,226,614 | B1 * | 5/2001 | Mizuno et al. .............. 704/260 |
| 6,477,491 | B1 * | 11/2002 | Chandler et al. ............ 704/235 |
| 7,222,075 | B2 * | 5/2007 | Petrushin .................. 704/270 |

FOREIGN PATENT DOCUMENTS

| | | |
|---|---|---|
| WO | 9931653 | 6/1999 |
| WO | 0116570 | 5/2001 |

OTHER PUBLICATIONS

A. Batliner, K. Fischer, R. Huber, J. Spilker, and E. Noth, "Desperately seeking emotions, or: Actors, wizards, and human beings", in Proceedings of the ISCA Workshop on Speech and Emotion, pp. 195-200, Belfast, Sep. 2000.*

S. McGilloway, R. Cowie, E. Douglas-Cowie, S. Gielen, M. Westerdijk and S. Stroeve, "Automatic recognition of emotion from voice: a rough benchmark." in Proceedings of the ISCA Workshop on Speech and Emotion, pp. 207-212, Belfast, Sep. 2000.*

G. Klasmeyer, "An automatic description tool for time contours and long-term average voice features in large emotional speech databases", in Proceedings of ISCA Workshop on Speech and Emotion, pp. 66-71, Belfast, Sep. 2000.*

A. Paeschke, M. Kienast, and W. F. Sendlmeier, "F0-Contours in Emotional Speech", Proc ICPhS, San Francisco, vol. 2. pp. 929-931, 1999.*

A. Paeschke and W. F. Sendlmeier, "Prosodic characteristics of emotional speech: measurements of fundamental frequency movements." in Proceedings of the ISCA ITRW on Speech and Emotion, Newcastle, pp. 75-80, Belfast, Sep. 2000.*

F. Dellaert, T. Polzin, and A. Waibel, "Recognizing emotion in speech", in H. T. Bunnell andW. ldsardi, editors, Proc. ICSLP, vol. 3, pp. 1970-1973, Philadelphia, Oct. 1996.*

L. Devillers, I. Vasilescu and L. Vidrascu, "F0 and pause features analysis for anger and fear detection in real-life spoken dialogs," Proc. Speech Prosody 2004 Nara, pp. 205-208, 2004.*

* cited by examiner

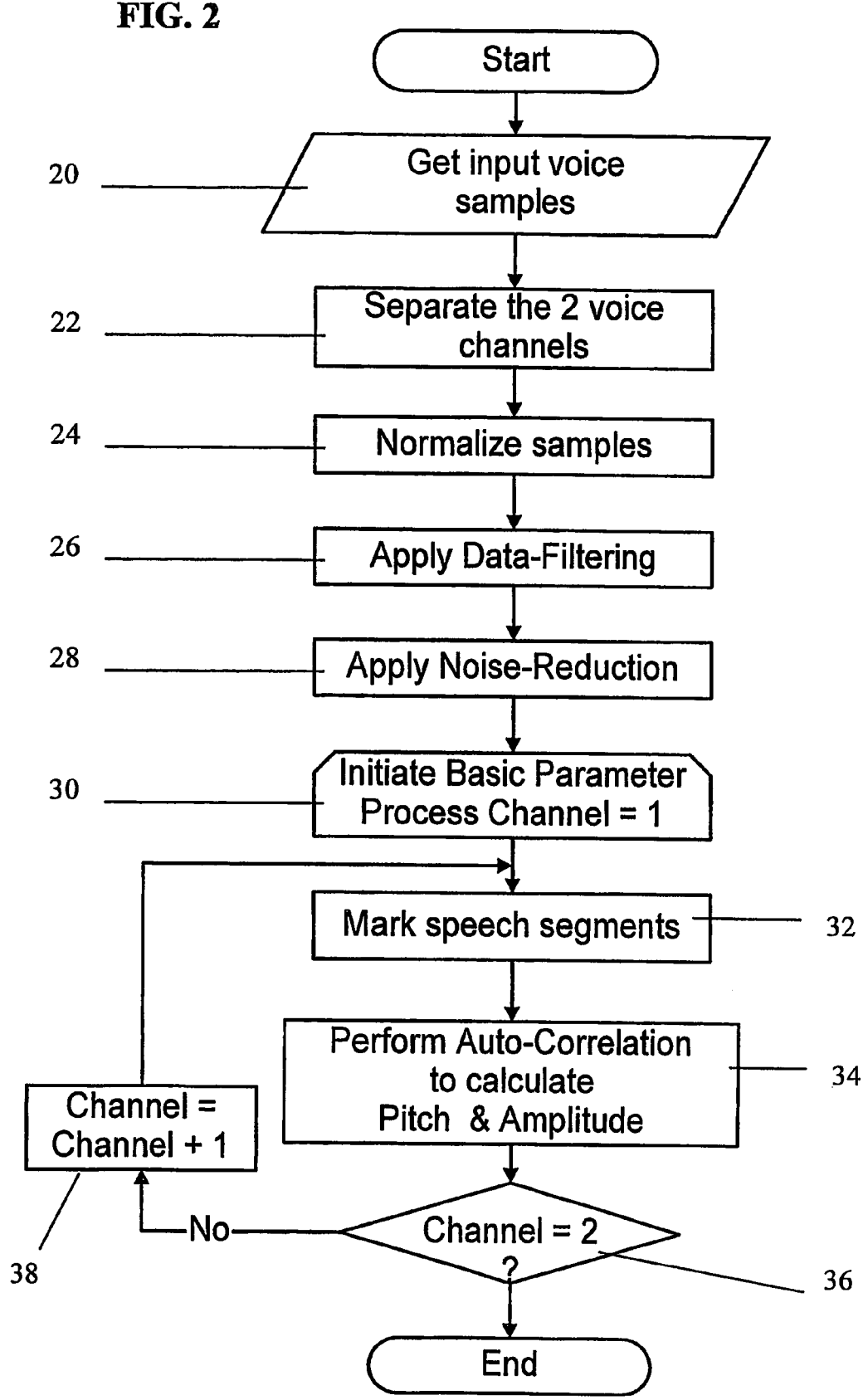

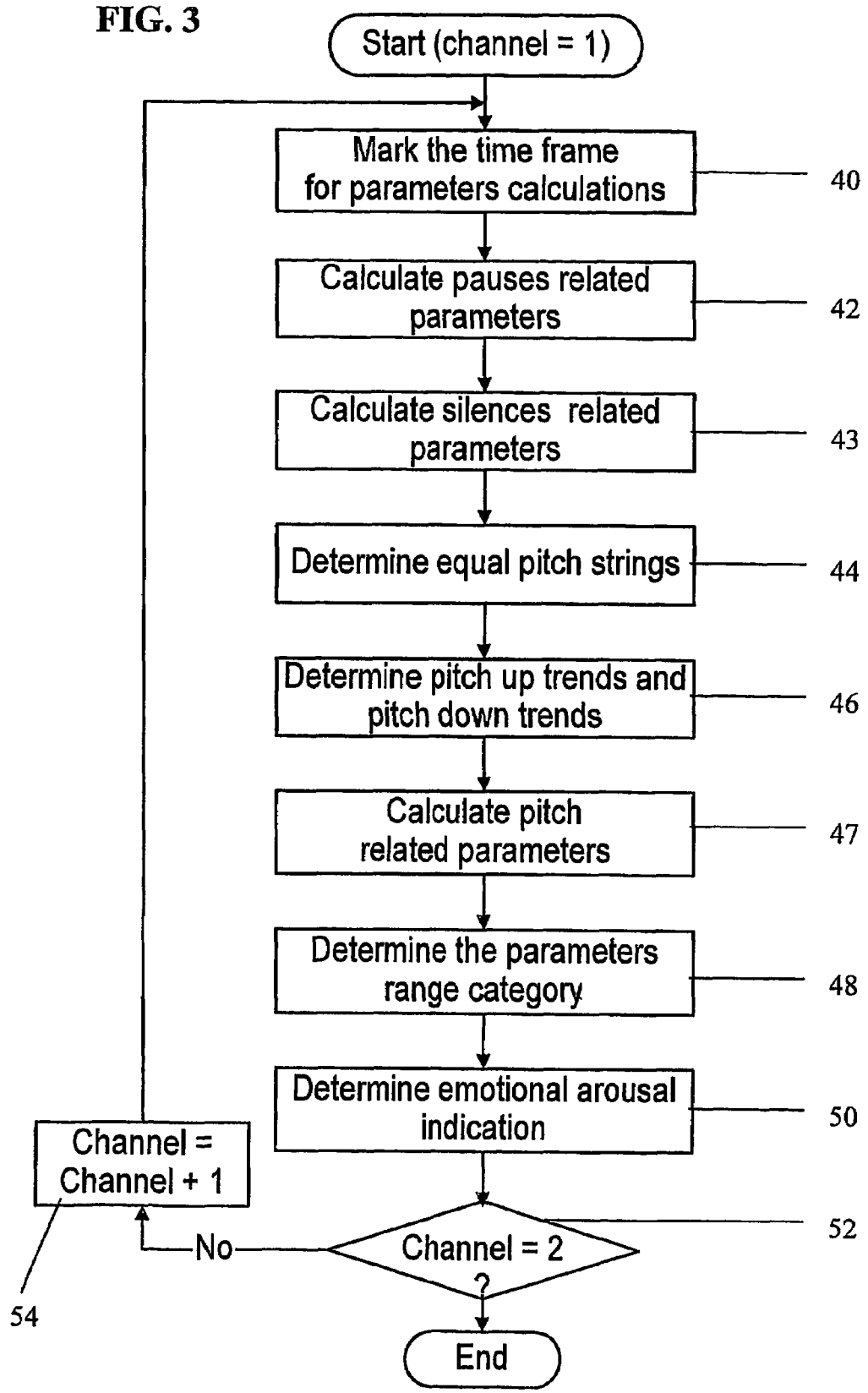

METHOD AND APPARATUS FOR DETERMINING EMOTIONAL AROUSAL BY SPEECH ANALYSIS

FIELD OF THE INVENTION

The present invention relates to the field of voice and speech analysis and in particular to the analysis of acoustic and prosodic features of speech.

This application is a filing under 35 USC 371 of PCT/IL2002/00648 filed Aug. 7, 2002.

BACKGROUND OF THE INVENTION

It is long known that certain voice characteristics carry information regarding the emotional state of the speaker. As far back as 1934, Lynch noted differences in timing and pitch characteristics between factual and emotional speech. (Lynch, G. E. (1934). A Phonophotographic Study of Trained and Untrained Voices Reading Factual and Dramatic Material, *Arch. Speech.* 1, 9-25.)

Since then, many studies have demonstrated correlations between various non-verbal speech characteristics and specific emotional states, and research efforts have been directed to different aspects of the emotional speech phenomenon. One line of research focuses on identifying the carriers of emotion within the speech signal, and studies have shown complex correlation patterns between pitch (the fundamental voice tone, dependent on the number of vibrations of the vocal cords per second), amplitude, timing, duration, pace, envelope contours and other speech variables and the emotional state of the speaker. A second research area tries to explore the expression of different emotional dimensions in speech, and the studies suggest correlations between constituent elements of speech and dimensions characterizing the emotional state of the subject. A further research effort focuses on revealing the distinctive correlations between parts of speech and various emotional states including primary emotions, such as anger, secondary emotions, such as boredom, for example, and specific stressful situations, such as anxiety, workload and lying, for example. Yet another area of research tries to point out the differences in emotional speech patterns between different individuals, different groups of individuals, as categorized by sex, age, culture and personality type, for example, and even between the voice patterns corresponding to different physiological states of the same individuals.

Three extensive literature reviews, summarizing the various findings regarding the vocal expression of emotion, were published by Murray, L. R. and Arnott, J. L., (1993), Towards the Simulation of Emotion in Synthetic Speech: A Review of the Literature on Human Vocal Emotion, *Journal of the Acoustical Society of America*, vol. 93 (2), 1097-1108, by Frick, R. W. (1985), Communicating Emotion The Role of Prosodic Features, *Psychology Bulletin*, 97, 412-429, and by Scherer, K. R. (1986), Vocal Affect Expression: A Review and a Model for Future Research, *Psychology Bulletin*, 99, 143-165. All these writers emphasize the fragmented nature of the research in this field, and point out that the vocal emotion research forms only a very small and isolated part of the general emotion literature and the general speech analysis literature. These reviews support the notion that human voice characteristics vary in relation to expression of emotion; yet, they highlight the complexity of the interplay between physiology, psychology and speech regarding emotions. They also stress the need for generalized models for a more coherent understanding of the phenomena.

In recent years, a few studies have approached the task of automatic classification of vocal expression of different emotional states by utilizing statistical pattern recognition models. Relative success has been achieved, see Dellaert, F., Polzin, T. S. and Waibel, A. (1996), Recognizing emotions in speech. In Proc. ICSLP, Philadelphia Pa., USA, 1996 and Amir, N. and Ron, S. (1998), Towards an automatic classification of emotions in speech. In Proc. ICSLP, Sydney, 1998, for example.

The field of emotion in speech is attracting increasing interest, and a special workshop dedicated to this topic was held in Belfast in September 2001 (ISCA workshop on Speech and Emotion—presented papers: http://www.qub.ac.uk/en/isca/proceedings/index.html). The papers, theoretical and empirical, reveal once more the complexity of the phenomenon, the lack of data and the various aspects that are involved.

In respect to the detection of emotion through speech analysis, the literature highlights several problems, yet to be resolved. We would like to emphasize two of the major problems:

The first problem is the lack of a unified model of emotional acoustic correlates, enabling the different emotional content in speech to be addressed by one general indicator; the current state of the research only enables the pointing out of isolated acoustic correlations with specific emotional states.

The second problem is the difficulty in overcoming the different speech expression patterns of different speakers, which tend to mask the emotional differences. Prior research has tried to confront the latter problem by obtaining reference speech characteristics of the tested individual, or of specific groups of individuals. The references being prior baseline measurements (non-emotional) of a specific subject, or the specific emotional speech profiles of relatively homogenous groups of subjects, such as all subjects suffering from depression, for example.

Several patents regarding this field have been registered over the years. These patents are mainly characterized as having the same limitations described above in regard to the academic research, namely, they focus on specific emotional states and depend on prior reference measurements. The patents also vary significantly in their measurement procedures and parameters.

Fuller, in three U.S. Patents from 1974, (U.S. Pat. No. 3,855,416; U.S. Pat. No. 3,855,417 and U.S. Pat. No. 3,855,418), suggests a method for indicating stress in speech and for determining whether a subject is lying or telling the truth. The suggested method measures vibratto content (rapid modulation of the phonation) and the normalized peak amplitude of the speech signal, and is particularly directed to analyzing the speech of a subject under interrogation.

Bell et. al., in 1976 (U.S. Pat. No. 3,971,034), also suggested a method for detecting psychological stress through speech. The method described is based mainly on the measurement of infrasonic modulation changes in the voice.

Williamson, in two patents from 1978 and 1979 (U.S. Pat. No. 4,093,821 and U.S. Pat. No. 4,142,067) describes a method for determining the emotional state of a person, by analyzing frequency perturbations in the speech pattern. Analysis is based mainly on measurements of the first formant frequency of speech, however, the differences corresponding to the different emotional states are not specified clearly: in the first patent, the apparatus mainly indicates stress versus relaxation, whereas in the second patent, the user of the device should apply "visual integration and interpretation of the displayed output" for "making certain decisions with regard to the emotional state".

Jones, in 1984 (U.S. Pat. No. 4,490,840), suggests a method for determining patterns of voice-style (resonance, quality), speech-style (variable-monotone, choppy-smooth, etc.) and perceptual-style (sensory-internal, hate-love, etc.), based on different voice characteristics, including six spectral peaks and pauses within the speech signal. However, the inventor states that "the presence of specific emotional content is not of interest to the invention disclosed herein."

Silverman, in two U.S. patents from 1987 and 1992 (U.S. Pat. No. 4,675,904 and U.S. Pat. No. 5,148,483) suggests a method for detecting suicidal predisposition from a person's speech patterns, by identifying substantial decay on utterance conclusion and low amplitude modulation during the utterance.

Ron, in 1997 (U.S. Pat. No. 5,647,834), describes a speech-based biofeedback regulation system that enables a subject to monitor and to alter his emotional state. An emotional indication signal is extracted from the subject's speech (the method of measurement is not described in the patent) and compared to online physiological measurements of the subject that serve as a reference for his emotional condition. The subject can then try to alter the indication signal in order to gain control over his emotional state.

Bogdashevsky, et. al., in a U.S. patent from 1999, (U.S. Pat. No. 6,006,188) suggests a method for determining psychological or physiological characteristics of a subject based on the creation of specific prior knowledge bases for certain psychological and physiological states. The process described involves creation of homogenous groups of subjects by their psychological assessment (e.g. personality diagnostic groups according to common psychological inventories), analyzing their unique speech patterns (based on cepstral coefficients) and forming specific knowledge bases for these groups. Matching to certain psychological and physiological groups can be accomplished by comparing the speech patterns of an individual (who is asked to speak a 30-phrase text similar to the text used by the reference group), to the knowledge bases characteristics of the group. The patent claims to enable verbal psychological diagnosis of relatively steady conditions, such as comparing mental status before and after therapy and personality profile, for example.

Pertrushin, in 2000 (U.S. Pat. No. 6,151,571), describes a method for monitoring a conversation between a pair of speakers, detecting an emotion of at least one of the speakers, determining whether the emotion is one of three negative emotions (anger, sadness or fear) and then reporting the negative emotion to a third party. Regarding the emotion recognition process, the patent details the stages required for obtaining such results: First, conducting an experiment with the target subjects is recommended, in order "to determine which portions of a voice are most reliable as indicators of emotion". It is suggested to use a set of the most reliable utterances of this experiment as "training and test data for pattern recognition algorithms run by a computer". The second stage is the feature extraction for the emotional states based on the collected data. The patent suggests several possible feature extraction methods using a variety of speech features. The third stage is recognizing the emotions based on the extracted features. Two approaches are offered—neural networks and ensembles of classifiers. The previously collected sets of data (representing the emotions) can be used to train the algorithms to determine the emotions correctly. Exemplary apparatuses as well as techniques to improve emotion detection are presented.

Slaney, in a U.S. patent from 2001 (U.S. Pat. No. 6,173,260), describes an emotional speech classification system. The system described, is based on an empirical procedure that extracts the best combination of speech features (different measures of pitch and spectral envelope shape), that characterizes a given set of speech utterances labeled in accordance with predefined classes of emotion. After the system has been "trained" on the given set of utterances, it can use the extracted features for further classification of other utterances into these emotional classes. The procedure doesn't present any general emotional indicator however, and only assumes that different emotional features can be empirically extracted for different emotional situations.

Two published PCT applications by Liberman also relate to emotion in speech. Liberman, in 1999 (WO 99/31653), suggests a method for determining certain emotional states through speech, including emotional stress and lying related states, such as untruthfulness, confusion and uncertainty, psychological dissonance, sarcasm, exaggeration. The procedure is based on measuring speech intonation information, in particular, plateaus and thorns in the speech signal envelope, using previous utterances of the speaker as a baseline reference.

Liberman, in 2000 (WO 00/62270), describes an apparatus for monitoring unconscious emotional states of an individual from speech specimens provided over the telephone to a voice analyzer. The emotional indicators include a sub-conscious cognitive activity level, a sub-conscious emotional activity level, an anticipation level, an attention level, a "love report" and sexual arousal. The method used, is based on frequency spectrum analysis of the speech, wherein the frequency spectrum is divided into four frequency regions and it is claimed that a higher percentage of frequencies in one of the regions reflects dominance of one of the emotional states above. It is suggested that cognitive activity would be correlated with the lowest frequencies, attention/concentration with main spectrum frequencies, emotional activity with high frequencies, and anticipation level with the highest frequencies.

Most of the abovementioned patents (Fuller, Bell, Jones, Silverman and Liberman) identify specific emotional states such as stress, lying or a tendency to commit suicide, by correlating specific speech features to these emotional conditions. Two of the patents (Williamson, Ron) assume that the appropriate speech correlates of the emotional states are given as input and totally ignore the task of describing any general indicator of emotional speech features. Three of the patents (Bogdashevsky, Petrushin and Slaney), suggest procedures for the extraction of specific speech correlates by "learning" given emotional classes of speech utterances. Thus, none of the abovementioned patents suggest a generalized speech based indicator of emotional arousal per se. that describes the speech expression of the emotional response created by a wide range of different emotional states.

Furthermore, in order to overcome the differences between individuals, some of these patents (Fuller, Williamson), require a skilled expert to manually analyze the results. Other patents (Ron, Liberman) require a comparison of the subject's speech measurements to prior baseline measurements of the same individual, as reference. Other patents (Bogdashevsky, Petrushin and Slaney), require a prior learning process of the speech characteristics of specific groups of individuals or specific psychological phenomena, to be used as reference.

Thus none of the above reviewed patents in this crowded art suggests an emotional speech indicator that is robust, having validity beyond different emotions and beyond the differences between specific individuals and specific groups. It is to the providing of such a robust, general indicator of emotional arousal by speech analysis, which is insensitive to the differences between subjects and to particular emotion types, but sensitive to emotional arousal per se. that the present invention is directed.

SUMMARY OF THE INVENTION

The present invention is directed to the provision of a general indicator of emotional arousal of a subject, by speech analysis, applicable to a wide range of different emotional states. This emotional speech indicator is valid beyond the speech pattern differences between specific individuals or specific groups of individuals, and does not require comparing a speech sample from a subject with a reference speech sample obtained earlier, from the same subject.

There is provided according to the present invention, a method for determining emotional arousal of a subject by speech analysis, comprising the steps of: obtaining a speech sample; pre-processing the speech sample into silent and active speech segments and dividing the active speech segments into strings of equal length blocks; the blocks having primary speech parameters including pitch and amplitude parameters; deriving a plurality of selected secondary speech parameters indicative of characteristics of equal-pitch, rising-pitch and falling-pitch trends in the strings of blocks; comparing the secondary speech parameters with predefined, subject independent values representing non-emotional speech to generate a processing result indicative of emotional arousal, and outputting the generated processed result to an output device.

Preferably the method of deriving further includes deriving a plurality of selected secondary speech parameters indicative of pause and silence characteristics of the speech sample being analyzed, optionally including analyzing irregularity of pace and rhythm, pitch, and amplitude of the speech sample being analyzed.

Optionally the plurality of selected secondary speech parameters are selected from the list of: average pause length and/or pause frequency; average length of short silences and/or short silences frequency; average length of equal pitch segments and/or equal pitch segments frequency; rising pitch segments length average and/or rising pitch segments frequency and/or falling pitch segments length average and/or falling pitch segments frequency; and the average amplitude dispersion within equal pitch segments of speech.

Optionally the step of obtaining a sample of speech comprises the step of inputting a digitized voice file. Alternatively, the step of obtaining a sample of speech comprises the step of capturing speech specimens and sampling and digitizing the speech specimens in a voice sampling and digitizing unit to form a digitized voice file.

Optionally, the step of pre-processing includes: obtaining digitized voice samples, normalizing said voice samples, data filtering, noise-reduction, segmenting the voice samples into silence and speech segments, dividing the speech segments into blocks, and processing the blocks by auto-correlation, to calculate pitch and amplitude voice parameters per block.

In one embodiment, the method described hereinabove may be adapted for analyzing a speech signal including a plurality of interacting voices, by it further comprising the additional steps of: separating the interacting voices into separate voice channels, obtaining digitized voice samples, performing samples normalization for each channel of interest, performing data filtering for each channel of interest, performing noise-reduction for each channel of interest, performing silence and speech segmentation and dividing the speech segments into blocks for each channel of interest, and auto-correlation processing to calculate pitch and amplitude voice parameters per block for each channel of interest.

Optionally, the step of deriving includes: marking a speech segment of a pre-defined length for processing; calculating pauses related parameters for said speech segment; calculating silences related parameters for the speech segment; joining blocks into strings of blocks categorized as being strings of blocks having rising pitch trends, strings of blocks having falling pitch trends and strings of blocks having equal pitch trends; calculating pitch related parameters within the speech segment—the pitch related parameters being selected from the list of frequency and average lengths of strings of blocks characterized by having rising, falling or equal pitch trends, and average amplitude dispersion of strings of blocks having equal pitch, and classifying the speech segment into one of several categories of typical parameter range.

Optionally, the step of comparing the secondary speech parameters with predefined, subject independent values representing non-emotional speech to generate a processing result indicative of emotional arousal includes comparing at least two secondary voice parameter categories with predefined values representing non-emotional speech, the categories being selected from the list of: average pause length and/or pause frequency; average length of short silences and/or short silences frequency; average length of equal pitch segments and/or equal pitch segments frequency; rising pitch segments length average and/or rising pitch segments frequency and/or falling pitch segments length average and/or falling pitch segments frequency; and the average amplitude dispersion within equal pitch segments of speech.

Optionally, the method further comprises calculating a reliability grade based on at least one factor selected from the list of: quality of voice segment; significance of emotional arousal decision, and consistency of specific segment results with results of previous speech segments.

Preferably, the quality of voice segment is determined, based on noise level, size of sampled data, and quality of sampled data.

Preferably, the significance of emotional arousal decision is determined, based on number of participating parameters and degree of deviation within each parameter.

Optionally, there is an additional step of pattern processing to detect emotional patterns that are revealed along a time axis.

In a second aspect, the present invention is directed to an apparatus for speech analysis comprising: a voice input unit, a pre-processing unit for pre-processing voice samples from voice input unit, a main processing unit for processing said pre-processed voice samples and detecting emotional arousal therefrom; and a main indicators output unit for outputting an indication of emotional arousal.

Optionally, the voice input unit includes a voice capturing unit and a voice sampling and digitizing unit coupled to the voice capturing unit for sampling and digitizing captured voice input.

Optionally, the voice input unit includes either a microphone, an interface to an audio player, an interface to a wired, wireless or cellular telephone, an interface to the Internet or other network, an interface to a computer, an interface to an electronic personal organizer or to any other electronic equipment, an interface to a toy.

Preferably, the voice sampling and digitizing unit is selected from a sound card, or a DSP chip-based voice sampling and digitizing device.

Preferably, the main indicators output unit is selected from a local output device, a display, a speaker, a file, a storage unit or monitoring device; or an interface to a remote computer, to the Internet, to another network, to a wired, wireless or cellular telephone, to a computer game, to a toy, to an electronic personal organizer or to any other electronic output equipment.

Optionally, all the aforementioned units are installed on a small, mobile, DSP chip based unit. Alternatively, some of the units may be physically distanced from other units, and the apparatus may further comprise an interface for allowing data communication between the units.

The pre-processing and processing units may alternatively be incorporated within a software tool capable of integrating with an external source of digitized voice input and with an external output device.

By primary speech parameter, as used herein, absolute values of parameters such as pitch or intensity are meant. By secondary speech parameter, the variation in the absolute values of the parameters used herein is meant. Thus secondary speech parameters are derived statistics that are generally less susceptible to cultural, age and gender differences, background interference, quality of signal analyzed and other distorting factors, and the secondary speech parameters used for indicating emotional arousal in preferred embodiments of the present invention, are selected as being particularly robust, having low sensitivities to the differences between individuals and to background interference.

BRIEF DESCRIPTION OF THE DRAWINGS

The present invention will be further understood and appreciated from the following detailed description taken in conjunction with the drawings in which:

FIG. 2 is a flow chart of a pre-processing unit constructed and operative in accordance with one embodiment of the present invention; and FIG. 3 is a flow chart of a main processing unit constructed and operative in accordance with one embodiment of the present invention.

DETAILED DESCRIPTION OF THE INVENTION

Figure 1:
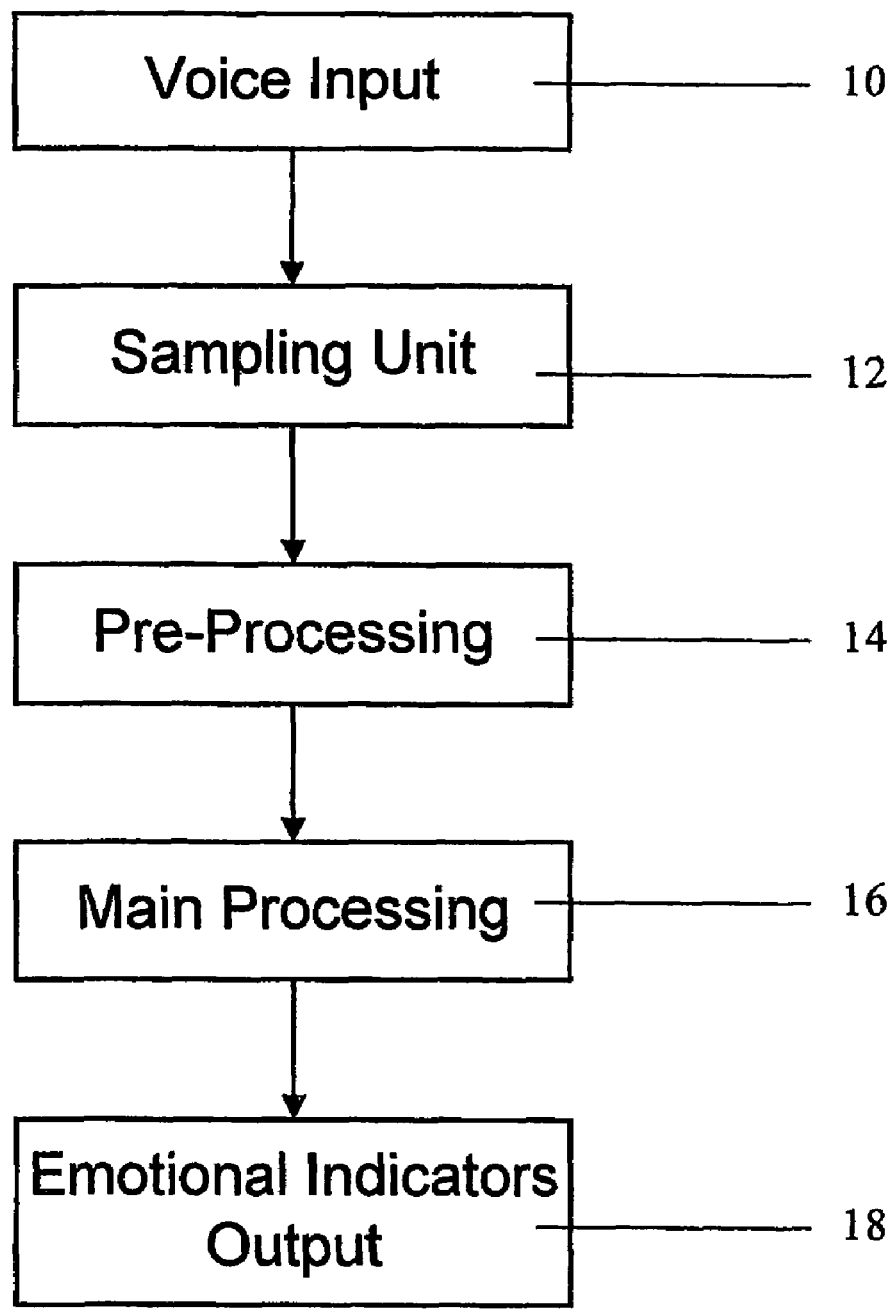
FIG. 1 is a block diagram illustration of an apparatus constructed and operative in accordance with one embodiment of the present invention.

The present invention relates to a method and apparatus for detecting emotional arousal through speech analysis. The term 'emotional speech' is used herein, in regard to a speech segment in which the speaker expresses himself in an emotional manner. Non-emotional speech refers to a speech segment in which the speaker does not express himself in an emotional manner. Past descriptions of experiences and feelings or future expectations for desired or undesired events may be considered emotional speech only if the actual described or desired feeling or event is currently expressed in an emotional manner. The literature and patents reviewed hereinabove, support clearly the phenomenon that different emotional states, when expressed vocally, alter the speech characteristics of a subject, in comparison to the characteristics of non-emotional speech. However, providing a general indicator that can determine the emotional arousal level of a person through speech analysis is still a very difficult task, mainly because of three factors:

1. Different emotional states affect differently the speech characteristics of an individual.

2. Voice and speech characteristics vary significantly between individuals.

3. Different emotional intensity (of the same emotion) affects different elements of speech to different extents.

In order to overcome the effect of these factors, most existing research and patents follow two guidelines: They separate the measurement of different types of emotions and they use prior samples to obtain a comparable reference baseline.

The present invention suggests an automatic, real time, speech analysis method for indicating the existence of a level of generalized emotional arousal of a subject at a given time, beyond specific emotion states and beyond specific differences between individuals, without using a reference speech baseline specific to the subject himself.

Eliminating the need for a specific reference baseline, the generalization of emotional arousal voice characteristics beyond specific emotional states and the emotional detection method based on pitch trends within the speech segment are three novel features of the present invention.

1. Emotional Arousal Beyond Specific Emotional States

A central assumption underlying the present invention is that non-emotional speech reflects an equilibrium state, and that emotional speech reflects a deviation from this balance. Emotional arousal is known to be a deviation from a physiological equilibrium in certain emotional states such as stress, for example. It is expressed in changes in autonomic system variables, such as heartbeat rate, muscle activity, galvanic skin resistance, blood pressure and blood temperature. In a corresponding manner, it is proposed that the changes in the speech patterns during emotional arousal may reflect a deviation from the balanced, ordered non-emotional state, and the present invention is based on the principle that the speech characteristics during emotional arousal are less systematic and more disordered than the characteristics of non-emotional speech. The violation of the ordered speech rhythm corresponding to extreme emotional arousal or excitement, such as crying or shouting, for example, is clear to most listeners. There are similar, corresponding changes in the ordered speech patterns that express minor excitement levels as well.

Although different emotional states may produce different speech characteristics, it is suggested that a common factor of speech characteristics in many different, emotionally aroused states, lies in the irregularity of the speech patterns when compared with the more systematic nature of non-emotional speech. Similarly, although different individuals who are emotionally aroused, or excited, may have different speech characteristics, it is nevertheless suggested that common to nearly all such emotionally aroused individuals, are less ordered speech patterns as compared to their general, non-emotionally aroused speech patterns. The present invention focuses on the measurement of this common factor, as an indicator highlighting the individual's general emotional arousal.

As reported in the literature, the expression of different emotional states has been found to correlate with specific speech characteristics. In contradistinction, we propose herein, that two types of variables tend to characterize 'emotional arousal' itself, rather than specific emotional states. The first variable, referred to herein as constant-pitch presence, is the degree of presence of equal-pitch periods within the speech segment, and the second variable is the consistency level of different speech characteristics, which is a measurement of the ordering of the speech pattern.

Constant pitch presence: As a general rule, it is suggested that emotional speech is characterized by lower presence of equal-pitch periods and higher presence of changing (rising or falling) pitch periods, meaning that emotional speech displays a smaller number per second and a shorter average length of equal-pitch periods within the speech segment as compared to regular, non-emotional speech. It should be noted that we do not suggest that emotional speech will always be characterized by a higher pitch variation/range or by higher frequency of pitch direction changes (rising/falling) within the speech segment, since the latter variables are more affected by specific emotional states, by individual differences and by speech loudness. In contradistinction, we suggest that the constant pitch presence parameters are less affected by the aforementioned intervening factors, than are the higher pitch variation/range/frequency of changes parameters. Consequently, they are strongly indicative of emotional arousal.

Consistency level of different speech characteristics: As mentioned, it is suggested that irregularity in speech patterns relates to emotional expression.

The general, less-ordered behavior of speech characteristics is evident through a higher inconsistency of several speech variables, such as the length and dispersion of intervals between sequential pauses and silences, the length of the pauses and the silences themselves and the length, frequency and dispersion of different types of non-silent segments (e.g. length of rising and falling pitch periods). Similarly to the measurement of equal-pitch presence, emphasis is put on measuring events on the time scale—number per second, lengths, intervals and dispersion of specific speech variables or grouped periods within the speech segment. These time-based variables are generally less affected than pitch and amplitude variables by intervening and biasing factors. Detecting a combination of deviations in some of these variables from an ordered speech structure can reveal the irregularity in speech patterns that relates to emotional arousal.

2. Overcoming the Effect of Individual Speech Patterns

As stated hereinabove, patterns of voice and speech vary significantly from one person to another. Some of these differences are of a general nature. For example, statistically, women's speech has a higher pitch than men's speech. Other differences are more specific. For example, the individual's speech has a typical pitch characteristic of that individual, and there are many other speech tendencies that characterize the speech of particular individuals, such as monotonous speech, paused speech etc.

In the embodiments of the present invention, to overcome the biasing effects due to the general characteristics of the individual's speech patterns, the determination of the general emotional arousal level of the subject makes selective use of secondary voice pitch parameters, and selective use of secondary voice amplitude parameters.

Use of secondary rather than primary speech parameters: Speech analysis in accordance with embodiments of the present invention uses mainly secondary voice and speech parameters and disregards primary parameters.

For the purposes of this application, the term secondary voice parameters imply parameters derived from the primary pitch and amplitude parameters, and not the primary parameters themselves. Primary parameters are greatly affected by the differences between individuals, and hence are not considered, or at least are not given weighty consideration in analyses performed in accordance with the present invention. Thus the voice frequency value, or pitch, itself, is generally not used as a parameter, since it varies significantly between different people. However, pitch changes within the speech segments are emphasized, since these contribute relative, rather than absolute values, and are, therefore, less affected by the differences between individuals.

Selective use of secondary voice pitch parameters: Secondary voice parameters are also sensitive, to a degree, to the differences between speech patterns of different individuals. The speech processing of the present invention ignores most of the secondary parameters most affected by these differences.

An example of a secondary voice pitch parameter not used, is the range of pitch change. This is considered to be a secondary parameter, since it represents only the relative changes of the speaker's pitch, and not the pitch itself. However, since this parameter correlates strongly to the actual pitch value, it is often markedly affected by the differences between individuals, and not only by the state of emotional arousal per se. Consequently, speech processing in accordance with the present invention typically ignores this parameter, and, likewise, other secondary parameters that vary significantly with the individual.

Selective use of secondary voice amplitude parameters: Many voice amplitude parameters, both primary and secondary, are more affected by speech differences between individuals than are pitch parameters. Amplitude parameters are also very susceptible to the general quality of the voice signal analyzed, which are adversely effected by environmental effects, such as interference, such as audio noise, and by electronic noise associated with the various components of the analysis equipment. Consequently, determining the existence of emotional arousal in accordance with the present invention puts little emphasis on amplitude parameters, both primary and secondary.

3. Overcoming the Effects of Intensity

Although the magnitude of the emotional arousal of a subject is sometimes indicated by the magnitude (volume) of the speech itself, this is not always the case. For example, when a person shouts in anger, usually his voice pitch, voice amplitude and speech speed increase, causing a corresponding increase in many secondary speech parameters as well, however, the speech profile of one shouting in anger may be very different from the speech profile of one displaying a less excited form of anger, although both represent emotional arousal. There are some people who demonstrate anger by talking quietly and deliberately, for example.

The present invention is focused on the detection of emotional arousal per se. and not only intense emotional arousal, or emotional arousal corresponding to any particular emotion. Moreover, since differences in speech volume that are not related to emotional arousal may affect speech characteristics in a biasing way, for instance by influencing the volatility level of certain speech parameters, it is important to minimize, as much as possible, the effects of speech volume on speech processing. This may be accomplished by following the same guidelines as those detailed above in regard to the overcoming of the effects of individual speech patterns, including the selective use of mainly secondary pitch and amplitude parameters. Still, in order to reduce the sensitivity of the processing to the effect of voice magnitude even further, additional processing is preferably performed. The main influence that the audible volume of speech has on the speech is on increasing or decreasing the ranges of its parameters. Consequently, the speech processing of the present invention generally makes an initial classification of each processed speech segment in accordance with one of several typical parameter range behavior classes. This initial classification enables the processing to use different criteria for determining the existence of emotional arousal in different parameter range classes.

4. Determining the Existence of Emotional Arousal

As mentioned hereinabove, after minimizing the different biasing effects, the speech characteristics that are associated most directly with emotional arousal have been found to be the degree of constant-pitch presence, the irregularity of pace, rhythm and other speech pattern indicators.

More specifically, the algorithm of the present invention uses a combination of at least two, and preferably more, of the following speech parameter categories:

- Pause length average and/or pause frequency
- Short silences length average and/or short silences frequency
- Equal pitch segments length average and/or equal pitch segments frequency
- Rising pitch segments length average and/or rising pitch segments frequency and/or falling pitch segments length average and/or falling pitch segments frequency.
- Amplitude dispersion within equal pitch segments of speech By 'pauses' relatively long silences in speech are intended, Pauses are typically about 0.25-1.5 second breaks in speech, usually appearing between sentences, for example.

By 'short silences', breaks having durations of less than about 0.25 seconds are intended. Short silences are the silences that typically appear between words and between syllables.

'Equal pitch segments' are continuous segments of speech that are characterized by having relatively stable pitch, that is, by the pitch varying between preset tolerances.

In contradistinction, 'Rising and falling pitch segments' are segments characterized by a continuous and definite rising or falling trend of pitch.

The determination of emotional arousal with a high degree of certainty requires that a combination of at least two, (preferably more), of the above parameters simultaneously deviate from non-emotional values. However, preferably the decision as to whether the subject indeed displays an emotional arousal may also be made dependent on the degree of the deviation of each parameter, with ranges and values that characterize regularity for each parameter having been determined by analysis of large samples of speech data taken from the general population.

Referring now to FIG. 1, there is shown a block diagram illustration of an apparatus for detecting emotional arousal constructed and operative in accordance with one embodiment of the present invention. The apparatus includes a voice input unit 10, a voice sampling and digitizing unit 12, a pre-processing unit 14, a main processing unit 16, and a main indicators output unit 18. Voice input unit 10 can be any device that carries human voice data in any form—microphone, wired telephone, wireless or cellular telephone, any audio-player device (such as tape-recorder, compact-disc), digitized voice files, Internet connection (voice over IP, cable, satellite or any other method). Voice sampling and digitizing unit 12 can be a computer sound card, a specific DSP chip or any other sampling and digitizing device.

The emotional arousal determination procedure, according to the present invention, is as follows (with some variations between different embodiments of the apparatus). The flow chart in FIG. 2 details the pre-processing stage and the flow chart in FIG. 3 details the main processing stage.

(a) Pre-processing—The pre-processing function serves to prepare the raw data for the processing itself. More specifically, it serves to obtain pitch and amplitude parameters per each speech block of a predefined length. The processor is a CPU unit, which may be the CPU of a PC, or may be a specific, dedicated DSP chip or indeed any other suitable processing device. The pre-processing includes the following processing steps, which are widely recognized by those familiar with the art of signal processing (FIG. 2):

Obtaining digitized voice samples (block 20)

Separation of group speech into individual voice channels' samples when required. For example, when the voice input is a telephone conversation, it is preferably divided into two voice channels, each representing a different speaker, possibly by separate sampling with one signal being obtained via the mouthpiece of one of the telephones, for example (block 22). Obviously, the pauses and the length of phrases in dialogue are significantly different from those in monologue, and these differences are appreciated and allowed for.

Normalization of the samples' values—performed for both channels (block 24)

Data filtering—performed for both channels (block 26)

Noise-reduction—performed for both channels (block 28)

Initiation of segmentation and basic parameters calculation for the first channel (block 30)

Silence and speech segmentation and dividing the speech segments into blocks (block 32) are performed for the first channel.

Auto-correlation (block 34) to calculate pitch and amplitude is performed for the first channel.

When there are two speakers, the segmentation and auto-correlation steps (blocks 30, 32, 34 above) are now performed for the second voice channel, if present (blocks 36 and 38).

The outputs of the pre-processing steps are strings of speech segment blocks characterized by having pitch and amplitude values per block and lengths for silence and pause segments.

(b) Processing—The main processing procedure provides an indication of emotional arousal. It may be performed on the same CPU processor where the pre-processing was performed, or alternatively, on a different CPU unit. The processing unit may be the CPU of a PC, a specific DSP chip or any other suitable processing device. The processing procedure includes the following processing steps, for each channel (FIG. 3):

Selecting a short, speech segment, typically, 3-6 seconds of speech, for processing (block 40).

Calculating pause-related parameters of the speech segment, including the average number of pauses per second and the average pause length (block 42).

Calculating silence-related parameters of the speech segment, including the average number of silences per second and the average silence length (block 43).

Determining which segment strings of blocks are segment strings having equal pitch blocks, by marking the consecutive blocks having relatively constant pitch (that is, within acceptable tolerances) (block 44).

Determining which segment strings of blocks display rising or falling pitch trends (block 46).

Calculating the secondary pitch parameters of the speech segment, such as the average number per second and the average length of rising, falling and equal pitch periods and the amplitude dispersion of equal pitch periods (block 47).

Classifying the processed speech segment into one of several categories of typical parameter ranges, in order to differentiate segments with different speech magnitudes (block 48).

Determining the emotional arousal indication of the speech segment. This indicator is based on comparison of the calculated voice parameters with pre-defined values representing non-emotional speech, and scoring the combination of irregularities (block 50).

If a second channel is present, i.e., taking specimens from two participants in a conversation (blocks 52 and 54), the same processing steps 40 to 50 are carried out on the sample from the second channel.

Preferably, the method also includes calculating a reliability grade—based on a combination of several factors, typically including the quality of the voice segment (noise level, size of sampled data, quality of sampled data), significance of the emotional arousal decision (number of participating parameters, degree of deviation of each parameter), consistency of the specific segment results with the previous speech segments (Emotional changes should follow reasonable patterns regarding the number of changes, their intensity, their length and switching between emotions in a given period of time).

Pattern processing—The processing may include another layer, which detects certain emotional patterns that are revealed with the passage of time, or when compared to other results. For example, when analyzing a conversation, comparing the emotional states of the two speakers enables the detection of patterns in the interpersonal communication, such as attachment, detachment, politeness, conversation atmosphere and progress.

(c) Output (FIG. 1, block 18)—The emotion measurement results can be sent to various outputs in accordance with the specific apparatus configuration used, and in accordance with the specific application. Normally, the output will be sent to a user's real time display (visual, vocal, or textual). It may be reported to a remote user through any kind of networking and it may be logged or stored to any sort of output or storage device or file.

5. Apparatuses and Possible Applications

By way of example, two basic apparatuses are presented for the patent implementation, although any other suitable apparatus can alternatively be employed:

(a) A small, mobile, DSP chip based unit. This apparatus can serve as a small mobile unit for emotional arousal detection in real-time or offline analysis. It can be used as a stand-alone device in interpersonal face-to-face interactions. Alternatively, it can be connected to input or output devices such as computer, audio player, wired or wireless or cellular telephone, electronic personal organizer, Internet or any other network, in order to obtain various local or remote voice inputs and to display or report to various local or remote outputs. It can also be integrated as hardware into other devices, such as wired, wireless or cellular telephones, computer games, toys, computers or any other electronic equipment. The apparatus includes a microphone (or any other input interface), digital sampler, processor and display (or any other output interface).

(b) A software-based tool. This apparatus can serve as a computer-based tool for emotion arousal detection in real-time or offline analysis. It can be used as a stand-alone software tool for analysis of digitized voice files. Alternatively, it can be connected through the computer interfaces to any input/output device, in order to obtain any local or remote voice input, and display or report to various local or remote outputs, such as microphones, audio players, wired or wireless or cellular telephones, Internet or any other network, other computers or any other electronic equipment. The software tool can also be integrated as a subsystem into another system. Such systems include call/contact center software for example, or hardware which monitors, records or analyzes conversations, various situation and personal trainers or any monitoring, teaching or feedback system. The emotion software tool will typically be installed into a computer environment that typically includes a microphone (or any other input interface), sampling and digitizing unit, processor, display (or any other output interface) and any other relevant external interface.

It will be appreciated that the present invention has a very wide range of possible applications and implementations. A few of the possibilities are listed below, by way of example only. However, the use of the present invention is not limited to those applications described herein.

Emotion monitoring can be used to improve marketing, sales, service and relations with customers, especially in the call center environment. The emotion monitoring, feedback and supervision of the service/sales interactions can be implemented in a real time environment, as well as in off line analysis. The monitoring can be implemented with both apparatuses described above: It can be integrated as a software tool into other call center products, such as recording tools, CRM (customer relation management) products, training tools or E-commerce software. It can be installed as a stand-alone software tool in the call center, CRM or E-commerce environments and it can also be integrated into various hardware devices in these environments as a DSP chip based unit. A small DSP chip based unit can also be used as an independent small unit for monitoring face-to-face agent-customer interactions.

Emotion monitoring can be used to improve the training process of various professional personnel by improving awareness of emotional, as well as non-emotional, verbal patterns, as expressed in a speaker's voice. In addition, the monitoring tool can be used for demonstration purposes (analyzing speech segments of different emotions and different emotion expression patterns) and for training in controlling emotion expression (feedback of user's emotions plus reward for altering emotion or expression pattern).

Emotional monitoring can be used as an assisting tool in various interpersonal managerial tasks, such as interviewing or negotiating, in meetings, or even when simply speaking on the telephone.

Monitoring emotion may be useful as an additional tool for psychological testing, and for diagnosis and treatment of specific illnesses, including psychiatric illnesses, for example. This monitoring can be conducted during real time conversations, or in off line analysis of recorded conversation, and it can be operated in face to face interactions, or when interaction occurs via the telephone or in vocal telecommunication over the Internet.

Advertising can also benefit from emotional monitoring, by adding significant value to the process of measuring and evaluating people's attitudes in verbal questionnaires, focusing groups, and other methods.

Emotional monitoring can be used to aid in speech therapy and to increase relaxation and to achieve more control over positive and negative emotional states. Altering the emotional state can be achieved either as a direct result of the increased awareness, or through a procedure similar to a biofeedback mechanism. One important application may be to assist the many programs aimed at reducing violent behavior among children and adults, where the monitoring can help to demonstrate and to alter patterns of verbal anger.

The use of emotion monitoring can provide an added quality to computer and electronic games, both educational and recreational games. Emotion monitoring can also be part of toys and games that interact with a child and reflect to him his emotional state.

Emotion monitoring in accordance with the present invention can also be used to improve speech recognition in various applications, and to enhance the interaction between a computer or robot and its user, by permitting the electric device to respond to the emotional state of people around it.

Emotion monitoring can even be used as a tool for detecting some mental states, which have distinctive voice characteristics, such as fatigue.

It will be appreciated that the invention is not limited to what has been described hereinabove merely by way of example. Rather, the invention is limited solely by the claims which follow.

The invention claimed is:

1. A method for determining emotional arousal of a subject by speech analysis, comprising the steps of:
   obtaining a speech sample;
   pre-processing the speech sample into silent and active speech segments and dividing the active speech segments into strings of equal length blocks; said blocks having primary speech parameters including pitch and amplitude parameters;
   deriving a plurality of selected secondary speech parameters indicative of characteristics of equal-pitch, rising-pitch and falling-pitch trends in said strings of blocks;
   comparing said secondary speech parameters with pre-defined, subject independent values representing non-emotional speech to generate a processing result indicative of emotional arousal, and outputting said generated processed result to an output device, wherein said secondary speech parameters comprise:
   (a) average length of short silences and number of short silences per unit of time;
   (b) average length of equal pitch segments and number of equal pitch segments per unit of time;
   (c) rising pitch segments length average and number of rising pitch segments per unit of time and falling pitch segments length average and number of falling pitch segments per unit of time; and
   (d) average amplitude dispersion within equal pitch segments of speech.

2. The method according to claim 1, wherein said step of deriving further includes deriving a plurality of selected secondary speech parameters indicative of pause and silence characteristics of the speech sample being analyzed.

3. The method according to claim 1, including analyzing irregularity of pace and rhythm, pitch, and amplitude of the speech sample being analyzed.

4. The method according to claim 1, wherein said step of obtaining a sample of speech comprises the step of inputting a digitized voice file.

5. The method according to claim 1, wherein said step of obtaining a sample of speech comprises the step of capturing speech specimens and sampling and digitizing the speech specimens in a voice sampling and digitizing unit to form a digitized voice file.

6. The method according to claim 1, wherein the step of pre-processing includes:
   obtaining digitized voice samples,
   normalizing said voice samples,
   reducing noise,
   segmenting said voice samples into silence and speech segments, dividing the speech segments into blocks, and processing said blocks by auto-correlation, to calculate pitch and amplitude speech parameters per block.

7. The method according to claim 1, adapted for analyzing a speech signal including a plurality of interacting voices, further comprising:
   separating the interacting voices into separate voice channels;
   performing samples normalization for each channel of interest;
   performing noise-reduction for each channel of interest;
   performing silence and speech segmentation and dividing the speech segments into blocks for each channel of interest, and
   performing auto-correlation processing to calculate pitch and amplitude speech parameters per block for each channel of interest.

8. The method according to claim 1, wherein the step of deriving includes:
   marking a speech segment of a pre-defined length for processing;
   calculating pauses related parameters for said speech segment;
   calculating silences related parameters for said speech segment;
   joining blocks into strings of blocks categorized as being strings of blocks having rising pitch trends, strings of blocks having falling pitch trends and strings of blocks having equal pitch trends;
   calculating pitch related parameters within the speech segment, said pitch related parameters comprising average length of equal pitch segments, number of equal pitch segments per unit of time, rising pitch segments length average, number of rising pitch segments per unit of time, falling pitch segments length average, number of falling pitch segments per unit of time and average amplitude dispersion within equal pitch segments of speech, and
   classifying the speech segment into one of several categories of typical parameter range.

9. The method according to claim 1, further comprising calculating a reliability grade based on quality of voice segment, significance of emotional arousal decision, and consistency of specific segment results with results of previous speech segments.

10. The method according to claim 9, wherein said quality of voice segment is determined, based on noise level, size of sampled data, and quality of sampled data.

11. The method according to claim 9, wherein said significance of emotional arousal decision is determined, based on number of participating parameters and degree of deviation within each parameter.

12. The method according to claim 1, further comprising pattern processing to detect emotional patterns that are revealed along a time axis.

13. The method according to claim 1, wherein:
   said obtaining step is carried out using a voice input unit;
   said preprocessing is carried out using a pre-processing unit for pre-processing voice samples from voice input unit;
   said deriving and comparing steps are carried out using a main processing unit for processing said pre-processed voice samples and detecting emotional arousal therefrom; and
   said processing result is outputted to a main indicators output unit for outputting an indication of emotional arousal.

14. The method according to claim 13, wherein said voice input unit of the apparatus includes a voice capturing unit and a voice sampling and digitizing unit coupled to said voice capturing unit for sampling and digitizing captured voice input.

15. The method according to claim 13, wherein said voice input unit of the apparatus includes at least one element selected from the group consisting of: a microphone, an interface to an audio player, an interface to a wired, wireless or cellular telephone, an interface to the Internet or other network, an interface to a computer, an interface to an electronic personal organizer or to any other electronic equipment, and an interface to a toy.

16. The method according to claim 14, wherein said voice sampling and digitizing unit of the apparatus is selected from the group consisting of a sound card, and a DSP chip-based voice sampling and digitizing device.

17. The method according to claim 13, wherein said main indicators output unit of the apparatus is selected from the group consisting of a local output device, a display, a speaker, a file, a storage unit, a monitoring device, and an interface to a remote computer, to the Internet, to another network, to a wired, wireless or cellular telephone, to a computer game, to a toy, to an electronic personal organizer or to any other electronic output equipment.

18. The method according to claim 13, wherein all said units of the apparatus are installed on a small, mobile, DSP chip based unit.

19. The method according to claim 13, wherein some of said units of the apparatus are physically distanced from other units, and said apparatus further comprises an interface for allowing data communication between said units.

20. The method according to claim 13, wherein said pre-processing and said processing units of the apparatus incorporate a software tool capable of integrating with an external source of digitized voice input and with an external output device.

\* \* \* \* \*